United States Patent [19]
Wang

[11] Patent Number: 5,122,506
[45] Date of Patent: * Jun. 16, 1992

[54] CONTACTLESS MASS MOVING SYSTEM

[75] Inventor: Xingwu Wang, Alfred, N.Y.

[73] Assignee: Howard J. Greenwald, Rochester, N.Y.

[*] Notice: The portion of the term of this patent subsequent to Oct. 2, 2007 has been disclaimed.

[21] Appl. No.: 521,909

[22] Filed: May 11, 1990

Related U.S. Application Data

[63] Continuation-in-part of Ser. No. 392,199, Aug. 10, 1989, Pat. No. 4,960,760.

[51] Int. Cl.$^5$ ............................................. F41B 6/00
[52] U.S. Cl. ............................................. 505/1; 89/8; 124/3; 376/101
[58] Field of Search .................... 89/8; 124/3; 310/14; 318/135; 335/216; 376/101; 505/1, 876, 878, 879

[56] References Cited

U.S. PATENT DOCUMENTS 4,960,760  10/1990  Wang et al. ............................. 124/3

FOREIGN PATENT DOCUMENTS 1903959  8/1970  Fed. Rep. of Germany ............ 89/8
304191  12/1988  Japan ................................. 376/101
196500  8/1989  Japan ................................. 124/3

OTHER PUBLICATIONS

Chen, K. W., "Magnetic Linear Accelerator (MAGLAC) as Driver for Impact Fusion (IF)," Impact Fusion Workshop, Aug. 1979, pp. 298-320.

*Primary Examiner*—Stephen C. Bentley
*Attorney, Agent, or Firm*—Howard J. Greenwald

[57] ABSTRACT

A process for moving a magnetized object at a velocity in excess of 10 kilometers per second is provided. In this process, a symmetrical chamber which contains alternating portions of superconductive material and electromagnetic coils is provided. A magnetized object is disposed within the chamber and caused to levitate there because of the Meissner effect. The magnetized object is accelerated within the chamber by supplying asynchronous direct current pulses to the coils within the chamber.

20 Claims, 5 Drawing Sheets

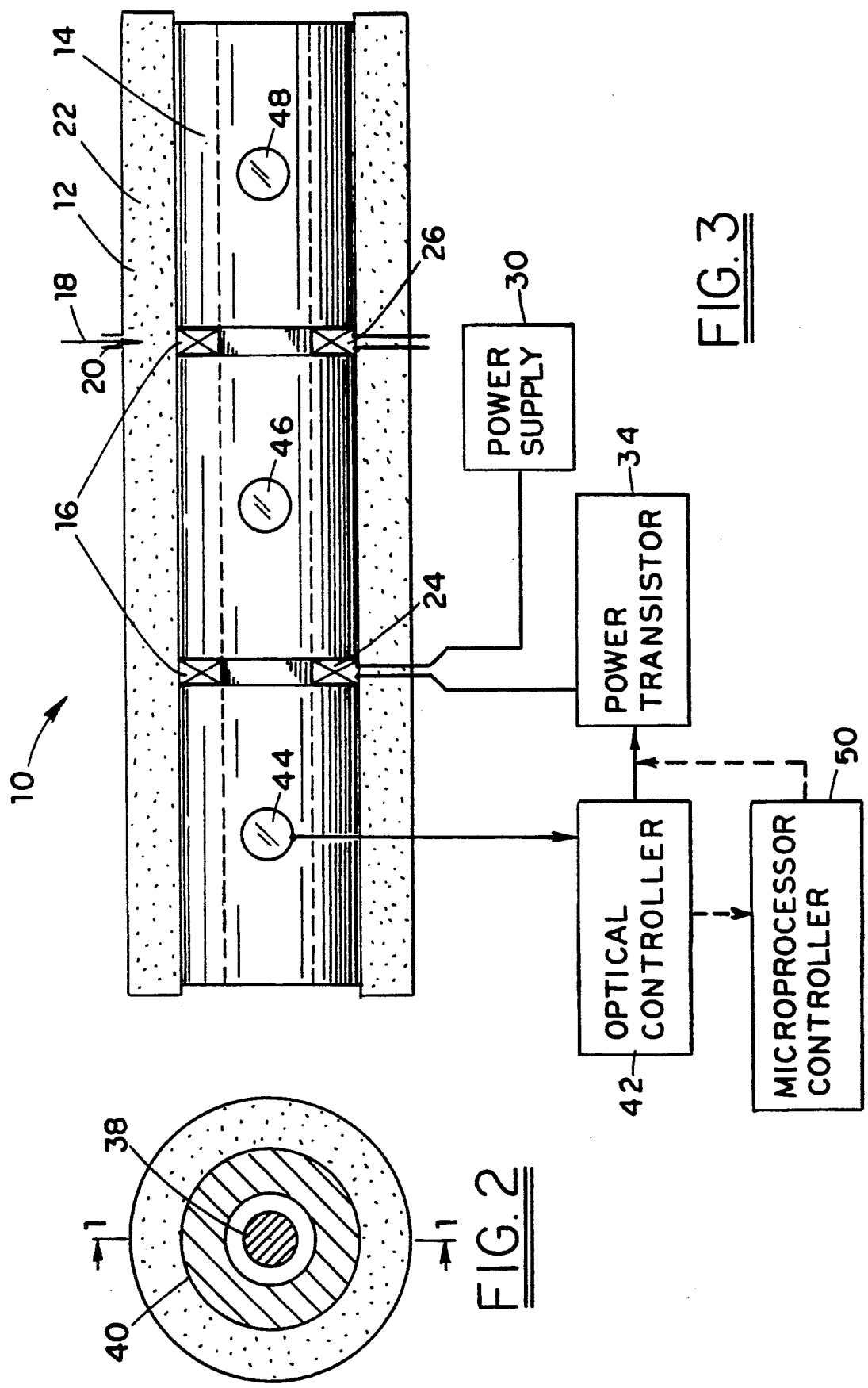

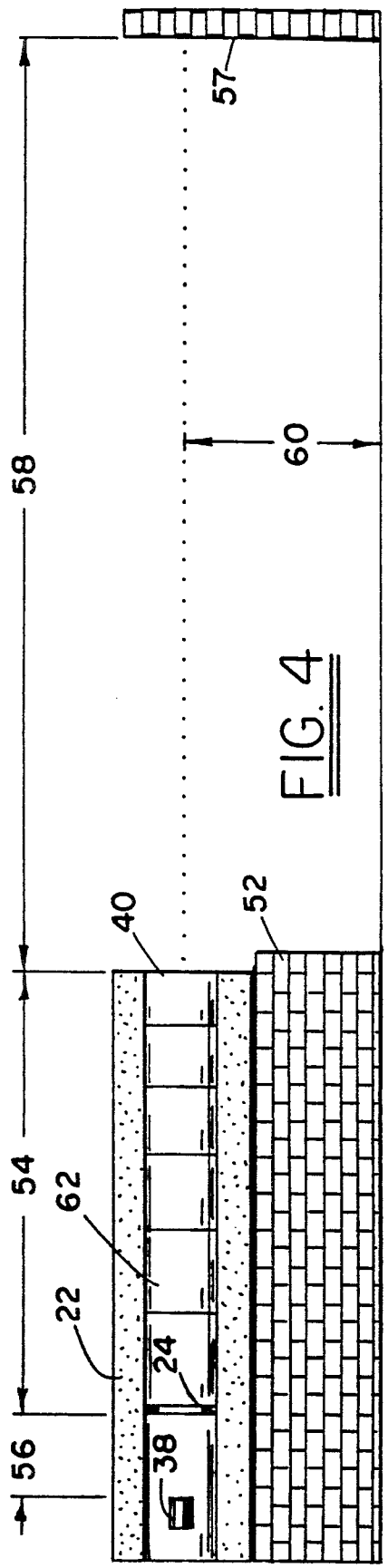
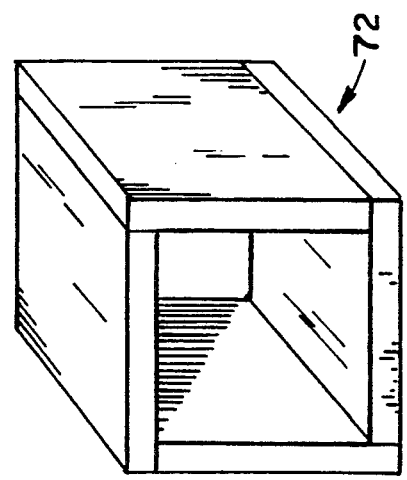
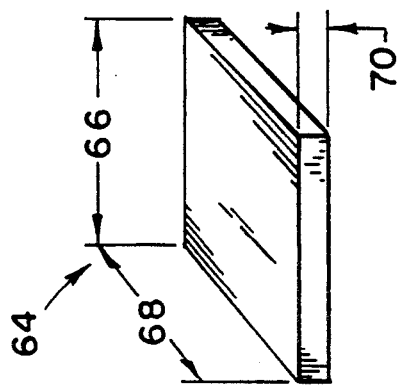
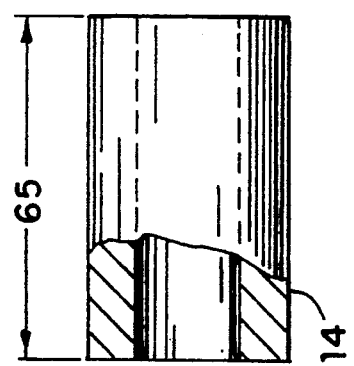
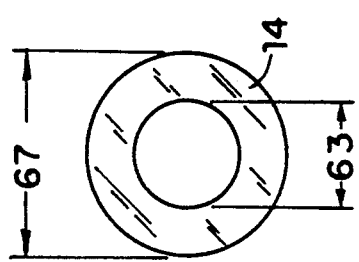

CONTACTLESS MASS MOVING SYSTEM

CROSS-REFERENCE TO RELATED PATENT APPLICATION

This application is a continuation-in-part application of applicant's copending application Ser. No. 07/392,199, filed Aug. 10, 1989, now U.S. Pat. No. 4,960,760.

FIELD OF THE INVENTION

A contactless system for moving articles by means of electromagnetic forces. By virtue of the Meissner effect between a superconductive material and a magnetic material, the object to be moved is caused to levitate.

BACKGROUND OF THE INVENTION

Electromagnetic rail guns are well known to those skilled in the art. See, for example, applicant's allowed, copending patent application Ser. No. 07/392,199, the disclosure of which is hereby incorporated by reference into this specification. Also see Japanese patent number 63-251799. One substantial problem with these rail gun systems is that at least about 70 percent of the energy provided to such a system is lost as contact friction.

It is known that nuclear fuel pellets must be moved at a relatively high velocity and low temperature in order to reach the center of the reactor intact. Thus, as is discussed in Japanese patent number 64-23098, in a nuclear fusion reactor, the fuel pellets must travel a long distance before they reach the center of the reactor. Because the temperatures along the travelling path are relatively high, the pellets (which contain hydrogen, deuterium, or tritium in ice phase) may evaporate before they reach the center of the reactor unless their velocities are greater than about 10 kilometers per second.

The injection of frozen pellets composed of the isotopes of hydrogen is widely used for refueling fusion power reactors. See, e.g., a review article by S. L. Milora entitled "Review of Pellet Fueling," Journal of Fusion Energy, Vol. 1, No. 1 (1981).

In a 1989 article by S. L. Milora, "Review of hydrogen pellet injection technology for plasma fueling applications," Journal of Vacuum Science Technology, Volume A7, pages 925-937 (May/June, 1989), the velocity desired for transferring the nuclear fuel pellets again was discussed. The author disclosed that ". . . velocities of 3.8 km/s have already been achieved with two stage light gas guns, and the prospects for attaining 5 km/s in the near future appear to be good."

An article by M. J. Gouge et al., "Design considerations for single-stage and two-stage pneumatic pellet injectors," Review of Scientific Instrumentation, Volume 60, pages 570-575 (April, 1989) also discloses that a velocity of from 4 to 6 kilometers per second might be achieved for such fuel pellets with two-stage pneumatic injectors.

One means of obtaining the required velocity of higher than 10 kilometers per second is proposed by F. Winterberg in an article entitled "Circular Magnetic Macroparticle Accelerator for Impact Fusion," Nuclear Fusion, Volume 30, No. 3, pages 447-451 (1990). Winterberg's proposal involves the use of a gram-size superconducting macroparticle. Winterberg proposes to accelerate such macroparticle to the velocity needed for impact fusion by means of a travelling magnetic wave. One problem with such proposal, when the known high Tc superconductors are embedded in an insulator (as proposed by Winterberger), diffusion often occurs with resulting degradation of the superconductor properties.

The aforementioned Japanese patent number 64-23098 disclosed a device for discharging a fuel pellet. The device of this patent was comprised of pulse coils surrounding superconductive or magnetic rail carrying pellets which were coated with superconducting or magnetic material. However, the device of this patent does not disclose a system which affords stable levitation and projection. There is no disclosure in the Japanese patent of the type of superconductor to be used or of any means for stabilizing the levitating object to be moved. In addition, there is no disclosure in the patent of the means for confining the projectile in a direction transverse to its flying direction.

It is an object of this invention to provide a mass transfer system which is at least about 80 percent efficient.

It is another object of this invention to provide a mass transfer system in which one or more nuclear fuel pellets is moved through a cavity at a speed greater than 10 kilometers per second.

It is yet another object of this invention to provide a mass transfer chamber which is comprised of means for stabilizing a levitated object disposed within the chamber.

It is yet another object of this invention to provide a means for preparing magnetized nuclear fuel pellets.

It is yet another object of this invention to provide a process for preparing a chamber coated with a film of superconductive material.

It is yet another object of this invention provide a process for coating nuclear full pellets with superconductive material.

It is yet another object of this invention to provide a process for preparing a chamber coated with a film of magnetic material.

SUMMARY OF THE INVENTION

In accordance with this invention, there is provided a process of moving a nuclear fuel pellet in a contactless mass transfer device. The contactless mass transfer device is comprised of a symmetrical chamber. The symmetrical chamber contains alternating portions of superconductive material and electromagnetic coils. Means are provided for sequentially creating and/or collapsing electromagnetic fields around the coils to facilitate the movement of a magnetic projectile through the chamber.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 2 is an end view of the chamber of the device of FIG. 1;

FIG. 3 is a schematic illustrating another preferred contactless mass transfer device;

FIG. 4 illustrates a process for evaluating the velocity imparted to a projectile by a contactless mass transfer device;

FIGS. 5, 5A, 6, and 6A illustrate certain preferred superconductive chambers which may be used in a contactless mass transfer device;

DESCRIPTION OF THE PREFERRED EMBODIMENTS

In applicant's claimed process, a preferred contactless mass transfer device is used. This device, referred to as "contactless mass moving (transfer) system 10," will be described in the first portion of this specification. Thereafter, applicant will describe the preparation of certain treated nuclear full pellets, and how such treated pellets may be moved with contactless mass transfer system 10.

Figure 1:
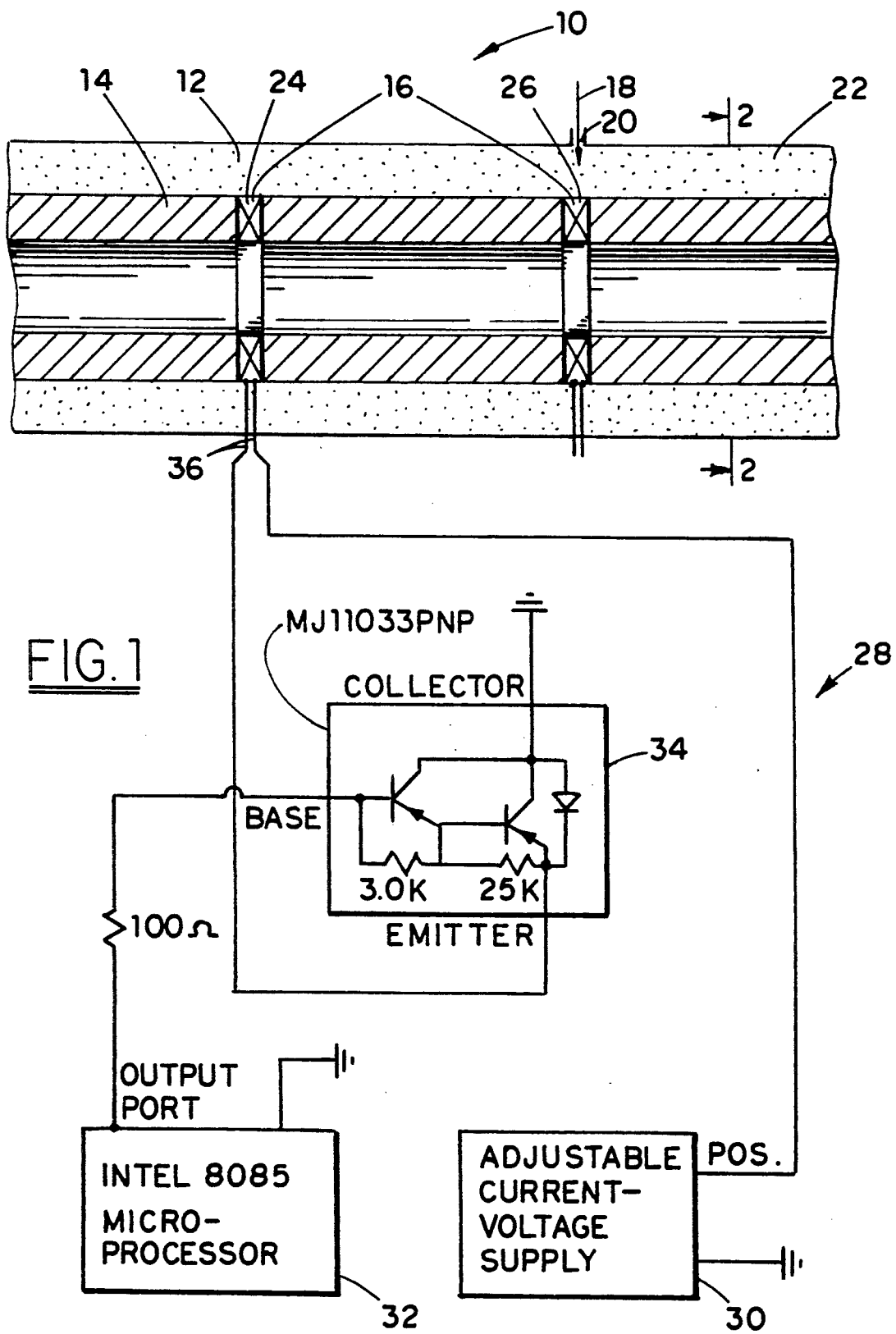
FIG. 1 is a cross-sectional view of one preferred contactless mass transfer device.

FIG. 1 illustrates one of the preferred embodiments of the contactless mass transfer device used in applicant's process. Referring to FIG. 1, contactless mass transfer system 10 is shown. mass transfer system 10 is comprised of means for cooling superconductive material 12, superconducting material 14, and means for generating an electromagnetic field 16. This system 10 may be used to accelerate a magnetized object (not shown).

Any means for cooling superconducting material below its critical temperature may be used. As is known to those skilled in the art, critical temperature is the temperature at which superconductivity occurs in a material. It is preferred that this temperature be no lower than about 85 degrees Kelvin.

Any cryogenic and/or refrigeration means for producing low temperatures known to those skilled in the art may be used as cooling means 12. Thus, by way of illustration and not limitation, one may use the cooling means described in U.S. Pat. No. 4,813,332 of Jasper, the disclosure of which is hereby incorporated by reference into this specification. By way of illustration and not limitation, suitable cooling means include liquid nitrogen, cryogenic refrigerators, compressed gas cryogenic refrigerators, and the like.

In one preferred embodiment, illustrated in FIG. 1, liquid nitrogen is fed via line 18 through inlet 20, thereby filling chamber 22. In this embodiment, chamber 22 is concentric with superconducting material 14.

In the preferred embodiment of FIG. 1, it is preferred that the cooling chamber 22 be substantially contiguous with superconducting material 14 in order to maximize cooling efficiency. It is preferred that at least about 90 percent of the exterior surface of superconducting material 14 be in contact with a surface of cooling chamber 22. In this preferred embodiment, both the superconducting material 14 and chamber 22 have a substantially cylindrical cross section, and substantially the entire outer perimeter of superconductor 14 is is contact with at least one portion of the interior perimeter of cooling chamber 22.

Cooling means 12, in addition to cooling the superconductor below its critical temperature, also preferably should cool the means 16 for generating an electromagnetic field to a temperature which may be at substantially the same temperature as the superconductor.

The superconducting material used in this invention has a critical temperature greater than about 77 degrees Kelvin and, preferably, greater than about 85 degrees.

One class of superconductors which may be used are "Type II" superconductors with a critical temperature greater than about 77 degrees Kelvin. As is known to those skilled in the art, Type II superconductors are characterized by first and second values of critical field, $H_{c,1}$ and $H_{c,2}$—in which field penetration first occurs at the lowest value to result in pinned fields which persist to much higher $H_{c,2}$ levels. See, e.g., U.S. Pat. No. 4,797,386 of Gygorgy et al. and M. Tinkham, Introduction to Superconductivity, Chapter 5, page 143 (McGraw-Hill, Inc., 1975), the disclosures of which are hereby incorporated by reference into this specification.

In an especially preferred embodiment, the superconductor material 14 has a critical temperature of at least about 77 degrees Kelvin, is a Type II material, and is a ceramic material.

In one preferred embodiment, the superconductor material used in the invention has specified $H_{c,1}$ and $H_{c,2}$ properties. The $H_{c,1}$ of these preferred materials is from about 10 to about 100 Gauss. The $H_{c,2}$ of these materials is from about 30 to about 100 Tesla. The second value of the critical field of the superconductor material is genrally at least about 10,000 times as great as the first value of the critical field of the material.

High-temperature superconductors which may be used in the invention are described in an article by A. W. Sleight entitled "Chemistry of High-Temperature Superconductors," Science, Volume 242 (Dec. 16, 1988) at pages 1519–1527, the disclosure of which is hereby incorporated by reference into this specification.

One preferred class of superconductors, described on pages 1522–1523 of the Sleight article, is of the formula $R\ Ba_2Cu_3O_{6+x}$, wherein x is from about 0.5 to about 1.0 and R is a rare earth element selected from the group consisting of yttrium, gadolinium, lanthanum, europium, holmnium, and the like. In one preferred embodiment, R is yttrium.

Another preferred class of superconducting materials is of the formula $(AO)_mM_2Ca_{n-1}Cu_nO_{2n+2}$, wherein A is selected from the group consisting of thallium, bismuth, and mixtures of bismuth and lead, m is from about 1 to about 2 (and generally is 1 or 2 when A is thallium and is 2 when A is bismuth), M is selected from the group consisting of barium and strontium, and n is at least 1. In one preferred embodiment, illustratred on page 1523 of the Sleight article, A is thallium, is 2, M is barium, and n is 3; this composition has a critical temperature of about 122 degrees Kelvin.

The superconductor used in this invention, when tested in accordance with a specified test, will have a specified levitation height. As is known to those skilled in the art, superconducting materials exhibit the "Meissner effect," which is the exclusion of a magnetic field from a superconductor. See, e.g., M. Tinkham's "Introduction to Superconductivity," supra.

As is known to those skilled in the art, levitation height may be calculated from the following Hellman equation:

$$d=(MH_{c,1}L/PDg)^{\frac{1}{2}},$$

wherein d is the levitation height, as measured from the center of the levitating object to the top surface of the superconductor, in centimeters; M is the magnetic moment of the levitating object, in gauss; $H_{c,1}$ is the first critical field value, as discussed hereinabove; L is the thickness of the superconducting material, P is pi, and is equal to about 3.1416, D is the density of the levitating object, and g is the gravitational constant, and is equal to about 9.81 meters per second per second. Reference may be had to an article by F. Hellman et al. entitled "Leviatation of a magnet over a flat type II superconductor" (Journal of Applied Physics, 63 (2), Jan. 15, 1988), the disclosure of which is hereby incorporated by reference into this specification.

In the levitation height test used, which determines the levitation height obtained by a specified magnet with the superconductor material to be tested, one uses a specified rare earth cobalt magnet (obtained from the Edmund Scientific Company) which had a magnetic moment of 8200 gauss, a mass of 0.54 grams, a length of 0.89 centimeters, a width of 0.48 centimeters, and a height of 0.34 centimeters is used. In this test, the superconducting material is formed into a flat disc with a thickness of about 0.5 centimeter and a diameter of about 3 centimeters.

The levitation height obtained with the superconductor flat disc which is tested in accordance with this procedure is preferably at least about 0.7 centimeters and, in an even more prefered embodiment, is at least 1.6 centimeters.

If the procedure is changed to vary, e.g., the thickness of the superconducting disc, the density of the levitating object, or other parameters described in the aforementioned formula, different levitation heights will result with the same superconductive material. Thus, two levitation height paramters are used to define applicants' system. One, the levitation height obtained with the superconductor material in the form of the specified flat disc, is determined in accordance with the afomentioned test. The second, the levitation height actually obtained in applicants' mass transfer system (which often will have superconductors with dimensions different than the disc used in the first test), may be estimated by the aforementioned Hellman equation; however, the precise levitation height must be measured during operation of the system. Such measurement may be made by cooling the superconducting chamber to a temperature below the critical temperature of the superconducting material in the chamber, inserting the magnetized object in the center of the chamber, and measuring the distance from the inner surface of the chamber to the center of the magnetized object being levitated. In general, in applicants' system, the levitation height of the system must be at least about 0.1 centimeters.

When reference is made to the levitation height hereafter, it will be understood that the levitation height of the system is being discussed and that, unlike the first leviation height parameter (which relates a height achieved in an open system), the height is obtained in a symmetrical chamber.

In the remainder of this specification, the first levitation height paramter will be referred to as the levitation height of the superconductor; and the second levitation height paratmer will be referred to as the levitation height of the system.

In one embodiment, the levitation height of the system may be increased by doping the superconductor material with silver. In general, from about 0.1 to about 10 weight percent (by total weight of superconducting material and silver) of silver or silver source is added. One may add pure, elemental silver. It is preferred, however, to add the silver in the form of a silver compound such as, silver oxide, silver dioxide, and the like. The addition of the silver dopant to the superconducting material is believed to increase its critical current; see, e.g., Tinkam's "Introduction to Superconductivity," supra.

In one preferred embodiment, the superconducting material is configured so as to maximize the stability of the projectile levitating within it. The stability of magnets levitated above superconductors depends upon several factors such as the flux penetration and the pinning effects. See, e.g., an article by L. C. Davis et al. entitled "Stability of magnets levitated above superconductors," Journal of Applied Physics, 64(8), Oct. 15, 1988, the disclosure of which is hereby incorporated by reference into this specification.

The pinning force exerted by the magnetized object upon the superconductive chamber may be estimated by the following formula of Davis:

$$F_D = 5LU_o(H_{max})^3/24J_c.$$

wherein $F_D$ is the pinning force (in Newtons), L is the levitation height of the system (in meters), $U_o$ is the magnetic permeability of free space (in tesla-meters/ampere), $H_{max}$ is the maximum magnetic field (in amperes/meter), and $J_c$ is the critical current of the supercondctor material (in amperes/square meter). Reference may be had to L. C. Davis et al.'s "Stability of magnets levitated above superconductors," page 4212, supra.

In one preferred embodiment, in order to maximize stability, a superconducting material 14 is formed into a hollow, symmetrical chamber. As used in this specification, the term symmetrical chamber refers to a chamber whose interior surfaces define a symmetrical shape. Thus, by way of illustration and not limitation, material 14 can be formed in the shape whose interior dimensions define a circular cross section; in this embodiment, the exterior dimensions of the body may define a circular cross section, a square cross-section, an irregular cross-section, and the like. Thus, e.g., material 14 can be formed in a shape whose interior dimensions define a square; the exterior shape of this chamber may be circular, square, or of an irregular shape, etc. Thus, the interior shape of the chamber may be triangular, pentagonal, hexagonal, heptagonal, octagonal, etc.

Two preferred shapes which may be used for the chamber of this invention are shown as elements 40 and 72 in FIGS. 5 and 6. In these embodiments, it is preferred to control the internal height of the chamber. In the case of the cylinder, such internal height is its internal diameter. In the case of the square, such internal height is the distance between two opposing internal surfaces. With other shapes, the internal height is the distance from the bottom to the top of the shape.

It is preferred, in this embodiment, that half of the internal height of the symmetrical chamber be less than the levitation height of the system, as defined above.

In one preferred embodiment, the superconductor used in the invention is of the formula $YBa_2Cu_3O_{7-x}$, the well known 1-2-3 superconducting phase. This superconducting material is prepared by a solid state reaction method. Stoichiometric amounts of yttrium oxide, barium carbonate, and copper oxide are intimately mixed and ground, and the powder is then calcined in a special calcination cycle.

In the preferred calcination cycle used by applicants, the material is first raised from ambient temperature to a temperature of from about 900 to about 960 degrees centigrade at a rate of from about 100 to about 400 degrees centigrade per hour. It is preferred to raise the temperature of the material from ambient temperature to a temperature of from about 910 to about 930 degrees centigrade at a rate of from about 275 to about 325 degrees centigrade per hour. Once the material reaches the temperature of from 900 to 960 degrees centrigrade, it is maintained at this temperature for from about 10 to about 15 hours. Thereafter, its temperature is reduced to ambient at a rate of about from about 100 to about 400 degrees per hour.

The cooled calcined material is then ground until substantially all of its particles are smaller than 53 microns, and then the entire calcination/grinding cycle may be repeated one or more times.

It will be apparent to those skilled in the art that other calcination/grinding cycles which improve the homogeneity of the powder batch also may be used.

Without wishing to be bound to any particular theory, applicants believe that the use of the grinding/calcination cycle produces a superconductor with a pure phase. Shaped objects made from material thus processed are less brittle.

Any conventional means may be used to prepare the shaped objects. Thus, for example, one may use the forming processes described in James S. Reed's "Introduction to the Principles of Ceramic Processing," (John Wiley and Sons, Inc., New York, 1988), the disclosure of which is hereby incorporated by reference into this specification.

In one preferred embodiment, the calcined powder is formed into a shaped object by pressing. The pressing techniques described at pages 329-355 of said Reed book may be used. In general, in this embodiment, it is preferred to use a pressing pressure of from about 10 thousand to about 25 thousand pounds per square inch. In a more preferred embodiment, the pressure used is from about 15,000 to about 20,000 pounds per square inch. In general, this pressure is applied to the powder for from at least about 2 minutes and, preferably, from about 4 to about 10 minutes. With the 1-2-3 calcined powder described above, a pressing time of from about 5 to about 7 minutes and a pressure of about 15,000 p.s.i. is suitable.

The pressed body is then preferably sintered under specified conditions to yield a sintered body with substantially no internal deformations. A unique sintering cycle is utilized for this purpose. During this entire sintering and annealing cycle, the pressed body is maintained under a flowing oxygen-containing gas while being sintered. The oxygen containing gas may be pure oxygen. The oxygen-containing gas preferably is at a pressure of at least about 1 atmosphere, and it is flowed over the pressed shape(s) at a rate of from 0.1 to about to about 10 cubic centimeters per minute.

It is preferred to raise the temperature of the formed body from ambient to a temperature of from about 920 to about 950 degrees centigrade at a rate of less than about 400 degrees centigrade per hour while the pressed body is under a flowing, oxygen-containing gas. It is more preferred to raise the temperature of the body from ambient to a temperature of from about 920 to about 930 degrees centigrade at a rate of less than about 300 degrees centigrade per hour.

Once the pressed body has reached the sintering temperature, it is maintained at this temperature under flowing oxygen-containing gas for at least about 20 hours. It is preferred to maintain the body at this temperature for from about 22 to about 26 hours. In one embodiment, the pressed body is maintained under these conditions for about 24 hours.

After the pressed body has been sintered under the aforementioned conditions, it is then cooled to a temperature of from about 600 to about 660 degrees centigrade at a rate of less than about 100 degrees centigrade per hour while under said flowing oxygen-containing gas. In one preferred embodiment, the sintered body is cooled to a temperature of from about 640 to about 660 degrees centigrade at a rate of from about 90 to about 100 degrees centigrade per hour.

After the sintered body has been cooled to a temperature of from about 600 to about 660 degrees centigrade, it is annealed at this temperature while under said flowing oxygen-containing gas for at least about 5 hours and, preferably, from about 5.5 to about 7.5 hours.

In the embodiment involving the 1-2-3 superconducting phase of yttrium/barium/copper, described above, the superconducting orthorhomic phase is formed during this annealing process. In one embodiment, during the annealing process, samples of the annealed material are periodically withdrawn and subjected to X-ray diffraction analysis to determine the phase purity. When the desired amount and type of the superconducting phase has been formed, the annealing process may be ended.

After the material has been annealed, it is then cooled to ambient temperature; it is preferred, though not essential, that this cooling step occur under flowing oxygen-containing gas. The cooling to ambient temperature occurs at a rate of less than about 300 degrees centigrade per hour.

The apparatus of this invention is comprised of means for generating an electromagnetic field 16. Any of the means for generating such a field may be used in this invention. Thus, for example, one may use a direct current passing through a conductor to generate an electromagnetic field.

In one preferred embodiment, means 16 is comprised of a symmetrical coil whose interior preferably will have substantially the same shape as the shape of the interior of the superconducting chamber; as long as the shape of the interior of the coil is symmetrical, its exterior may (but need not) have a nonsymmetrical shape. Thus, by way of illustration, the interior of the coil may define a circular cross-section and the exterior of the coil may define an irregular cross-section. Thus, in one preferred embodiment, both the interior and exterior portions of the coil define a circular shape. In another preferred embodiment, the interior and exterior surfaces of the coil are both square. See, for example, FIGS. 1, and 8.

It is preferred to use coils in the apparatus of this invention which, regardless of their shape, are substantially symmetrical and have a center line from which all of the interior surfaces of the coil are substially equidistant. Thus, for example, the coil may be in the shape of a cylinder or a square; and the magnetic projectile will levitate by Meissner effect along about the center line of said coil. One complicating factor in the device of this invention is the effect of gravity. With a substantially symmetrical coil, the forces from the Meissner effect exert an equal effect upon a projectile in the middle of the coil, thereby tending to maintain it in the middle position. However, the force due to gravity, in addition to the Meissner effect, tends to pull the projectile towards the earth; and the combination of all forces tends to pull the projectile from the desired middle position. Thus, it is critical to utilize a superconductive system with a specified levitation height, to have the material in a configuration such that its distance from the projectile does not exceed a certain fraction of the levitation height of the system, and to have a certain specified configuration in the superconductive chamber.

Any of the coils known to those skilled in the art may be used in the invention; and any of the materials conventionally used in such coils also may be utilized. Thus, one may use copper wire, silver wire, or superconducting wire. As is known to those skilled in the art, superconducting wire may be made out of any of the superconducting materials. See, for example, U.S. Pat. No. 4,796,511 of Eyssa, the disclosure of which is hereby incorpoorated by reference into this specification.

In one preferred embodiment, wherein copper or silver wire is used, it is preferred that the gauge of the wire be from about 10 to about 40. As is known to those skilled in the art, the gauge of a wire conductor is specified as "American Wire Gauge Conductor Series"; and an AWG number of 26, e.g., refers to 26 gauge wire. A table describing the AWG conductor series appears, e.g., on page 766 of Herbert W. Jackson's "Introduction to Electric Circuits," Sixth Edition (Prentice Hall, Englewood Cliffs, N.J., 1986), the disclosure of which is hereby incorporated by reference into this specification.

It is preferred that one use a wire conventionally referred to as "magnet wire" with a gauge of from about 20 to about 30; see, e.g., page 793 of catalog 110 of Newark Electronics, Chicago, Ill.

For the embodiment illustrated in FIG. 5, it is preferred that the gauge of the wire in the coils be from about 20 to about 30 and, more preferably, be from about 25 to about 27.

Each electromagnetic coil used in applicants' system preferably has a thickness no greater than the gap which occurs between adjacent superconducting portions of the superconducting chamber. As will be seen by reference to FIG. 1, the superconducting chamber in which the magnetized projectile is levitated is preferably comprised of alternating sections of superconducting material and electromagnetic coils. Thus, the portion of the device shown in FIG. 1 illustrates, from left to right, a superconducting cylindrical portion 14, an electromagnetic coil 24, a second superconducting cylindrical portion, a second electromagnetic coil 26, and a third superconducting cylindrical portion. Each of the superconducting portions 14 are separated by an air gap which is filled by an electromagnetic coil.

The gap between adjacent superconducting cylindrical portions should be no greater in width than about one-half of the levitation height of the system defined above. Thus electromagnetic coils 24 and 26 fit within said gaps and are preferably contiguous with the superconducting cylindrical portions on each side of them; and thus said coils also should be no greater in width than about one-half of the levitation height of the system.

In one preferred embodiment, the internal diameter of the electromagnetic coil is substantially identical to the internal diameters of the superconducting cylindrical portions to which said coils are immediately adjacent and contiguous to; and the external diameters of said electromagnetic coils are substantially identical to the outside diameters of said superconducting cylindrical portions. In one embodiment, each of the superconducting cylindrical portions in the chamber and each of the electromagnetic coils will have the same internal diameter and the same outside diameter.

The length of any one of the cylindrical superconducting elements may be the same as or different than the length of any of the other of the superconducting elements; and the width of any one of the electromagnetic coils may be the same as or different from the width of any of the other of the electromagnetic coils. It is preferred to have at least two of said superconducting cylindrical elements and at least one coil in the device of this invention. In one preferred embodiment, each of the electromagnetic coils will have a different width, a different number of turns, and thus a different magnetic field produced by a specified current from each other.

It is essential that the length of each superconductive cylindrical element be at least about 4 times as great as the width of the electromagnetic coil(s) contigous with and adjacent to said element.

The means for generating an electromagnetic field, in addition to said electromagnetic coils, also includes connecting leads from a current source. Although FIG. 1 only illustrates leads from pulse delivery means 28 to coil 24, it is to be understood that comparable direct current pulses are also delivered to coil 26 (and to the other coils in the device). However, it should be noted that each of the coils does not receive a direct current pulse at the same time. The direct current pulse delivered to any one coil may be the same, or different, from the direct current pulse delivered to any other coil.

The direct current pulses delivered to the coils are asynchronous. The term asynchronous, as used in this specification, refers to means for delivering direct current pulses to a two or more coils at different periods of time; the asynchrony referred to is one of time. The apparatus of this invention is preferably comprised of means for delivering asyncrhonous direct current pulses to at least two coils at different periods of time.

The coil(s) used in the apparatus of this invention may be coated by a non-magnetic insulating binder material. Thus, by way of illustration and not limitation, the wire coil may be immersed in a rubber cement, epoxy resin, silicone rubber, and other insulating coatings; see, e.g., Brady and Clauser's "Materials Handbook", Twelfth Edition (McGraw-Hill Inc., New York 1986), the disclosure of which is hereby incorporated by reference into this specification. Thus, referring to page 883 of the Newark Electronics catalog 110, one may use Q-dope, Cornona-Dope, Red-X Corona dope (a thixotropic, polyester-based red enamel), Red-Glypt Insulating Varnish (an alkyd-base compound), and the like.

Direct current is delivered to the coils of the apparatus of this invention. As used in this specification, direct current refers to current which flows in only one direction through a circuit and has a substantially constant amplitude during a given time period. Thus, this term excludes "pulsating direct current."

The electromagnetic force created in any one coil by the direct current pulse may be calculated by means well known to those skilled in the art. Thus, for example, one may use the equation 11.5 described on page 385 of G. P. Harnwell's "Principles of Electricity and Electromagnetism," Second Edition (McGraw-Hill Book Company, New York, 1949), the disclosure of which is hereby incorporated by reference into this specification. This equation 11.5 may be rewritten as:

$$F = M_1 M_2 / (4 P U_o r^2),$$

wherein F is the attractive force between the electromagentic field and the magnetic object, in newtons; $M_1$ is the pole strength of the electromagnetic coil, in tesla-meters squared; $M_2$ is the pole strength of the magnetic object being levitated, in tesla-meters squared; r is the separation between the surface of the electromagnetic coil and the magnet surface being levitated; and the other terms are defined elsewhere in this specification. $M_1$ is directly proportional to the current (in amperes) delivered to the coil, the number of turns in the coil, and the cross-sectional surface area of the coil; and it is inversely proportional to the radius of the coil. The magnetic induction of the coil (which is equal to $M_1$ divided by the surface area of the coil) may be measured by a Gaussmeter such as the one obtainable from Bell Communications Inc. of Florida). By the same procedure, the $M_2$ of the levitating object also can be determined.

An equation enabling one to estimate the pinning force of the superconductive chamber is presented elsewhere in the specification. One must provide a sufficient amount of direct current to the coil(s) so that its magentic force is at least about ten times as great as the pinning force of the chamber, as calculated by the pinning force equation. Thus, the apparatus of this invention provides a means of generating an electromagnetic force which is at least ten times as great as the pinning force of the superconductive chamber.

One means of providing a sufficient amount of electromagnetic energy to the system is illustrated in FIG. 1. Referring to FIG. 1, means for delivering direct current pulses 28 is comprised of power supply 30, controller 32, power transistor 34, leads 36, and coils 24 and 26.

Power supply 30 provides a means for supplying a direct current and voltage to the coil(s) in the system. The power supply is adjustable, and one may vary the amount of voltage and/or current delivered. Any suitable power supply 30 may be used. Thus, e.g., one may use any of the d.c. power supplies described on pages 512, 515, and 521 of the catalog 110 of Newark Electronics.

In one preferred embodiment, the power supply used was a 20 volt, 12 ampere 6263ADX power supply obtained from Harrison Laboratories.

The rise time of the the power supply should be relatively small. As used in this specification, the term rise time refers to the time, in seconds, it takes the power supply to rise to the specified current or voltage desired from the system. In general, the power supply 30 must have a rise time of less than 1 millisecond.

Another important parameter is the decay time. As used in this specification, the decay time is the amount of time, after the power supply is turned off by a control signal, it takes the current or voltage applied to the coil to return to zero. The decay time should be less than about 1 millisecond. The rise time and the decay time will vary with the inductance associated with the system, which is mainly due to the coil.

Controller 32 sends out a controlled signal to the base of the power transistor 34 and thus, by changing the bias voltage of the PNP transistor, changes the output signal from the emitter of the transistor, which is delivering current to the coil. In the configuration shown in FIG. 1, when the output from controller 32 is most positive, no current flows from the emitter to the coil. The maximum amount of current flows to the coil when the output from the controller is most negative. As is apparent to those in the art, if an NPN transistor is used, the opposite situation will occur; the maximum amount of current will flow when the controller output is most positive.

The controller illustrated in FIG. 1 is an an Intel 8085 Microprocessor (made by Intel Corporation, Santa Clara, Calif.). This controller is capable of delivering a control signal to a switch (the transistor) which delivers pulses to the switch at different points of time. In the embodiment shown in FIG. 1, the controller delivers on-state pulses ($-5$ volts) and off-state pulses (0 volt).

Any means for delivering pulses to the switch at different points in time may be used as controller 32. Thus, by means of illustration, and not limitation, one may use a computer, a mechanical switch, and the like.

The pulses delivered by controller 32 are supplied to switch 34 which, in the embodiment illustrated in FIG. 1, is an PNP type power transistor. This power transistor is capable, in response to receiving negative bias signals from controller 32, of switching current from power supply 30 on and off.

It will be apparent to those skilled in the art that other switches 34 may be used. Thus, e.g., one may use an NPN transistor with the opposite polarity. Thus, e.g., one may use other semiconductor switches such as TRIACs, thyristors, mechanical relays, and the like. These and other suitable switching devices are described in the "McGraw-Hill Encylopedia of Electronics and Computers," (McGraw-Hill Inc., New York, 1984), the disclosure of which is hereby incorporated by reference into this specification.

The power supply 30, the controller 32, and the power transistor 34 provide only one means of delivering intermittent direct current pulses to coil 24. As will be apparent to those skilled in the art, other such means can be used. Thus, for example, one may use high-current pulse generators obtainable from, e.g., Hewlett Packard Company of New Jersey. Thus, e.g., one may use the power supply circuits described in R.F. Graf's "The Encyclopedia of Electronic Circuits" (Tab Books, Inc., Blue Ridge Summit, Pa., 1985), the disclosure of which is hereby incorporated by reference into this specification.

For the sake of simplicity, controller 32 is shown controlling the provision of direct current pulses to only coil 24 in FIG. 1. However, controller 32 may be used to control up to eight different circuits and, via these circuits, may deliver asynchronous direct current pulses to up to 8 different coils in an apparatus similar to that illustrated in FIG. 1. When more than one coil is present in such apparatus, controller 32, and/or some similar device, must deliver asynchronous direct current pulses to the coils in such apparatus. Such coils must receive their direct current pulses at different times from the other.

In one embodiment, not shown, the Intel 8085 microprocessor is combined with additional circuitry (a multiplexer) and thus enabled to control the output to more than eight coils. In another embodiment, not shown, the controller 32 used is a Motorolla 68000 microprocessor capable of controlling 16 individual coils (obtainable from Motorolla Semiconductor Products, Inc. of Phoenix, Ariz.). In yet another embodiment, a separate circuit is used to provide the asynchronous d.c. pulse to coil 26. In yet another embodiment, a personal computer is used as controller 32.

FIG. 2 is a cross-section of the superconducting chamber of FIG. 1. Magnetic object 38 levitates within symmetrical superconductive cylinder 40 which is cooled by the liquid nitrogen in the cooling chamber.

An alternative means of providing asynchrounous direct current pulses to coils 24 and 26 is illustrated in FIG. 3. This embodiment is comprised of a multiplicity of optical sensors 44, 46, and 48 which, in response to the movement of a projectile within the cylindrical superconductor chamber 40, activates the delivery of a direct current pulse to a coil.

Any of the optoelectronic sensing devices known to those skilled in the art may be used. Thus, for example, one may use the optoelectronic devices described on pages 13 to 25 of Archer's 1986 Semiconductor Reference Guide catalog (catalog number 276-4009, Radio Shack Corporation, Fort Worth Tex.). Thus, one may use the optical sensors described on pages 68, 69, 83, 94, 95, 126, and 127 of catalog 110 of Newark Electronics.

The prior art optical sensors may be used in different configurations. In one circuit, the direct current to each of coils in the apparatus is on, and the optoelectronic device sends out a signal in response to the projectile's motion, turning off the coil which the projectile is approaching. In this embodiment, the coils are so wound that, in their on position, they attract the projectile.

In another embodiment, the coils in the system are off prior to the movement of the projectile. The coil closest to the projectile is first turned on (to attract it) and then off (to allow it to pass through the coil substantially unimpeded). Thereafter the next coil is turned on before the projectile reaches it, and then turned off, etc. The projectile thus may be accelerated down the chamber at a controlled rate by the application of asynchronous direct currents to the coils.

The movement of the projectile past or near an optical sensor activates that sensor. Thereafter, as is shown in FIG. 3, a signal may be sent from sensor 44 to optical controller 42.

Optical controller 42 may be any means for supplying a control signal to switch 34 in reponse to a signal from the optical sensor. Thus, e.g., controller 42 may be a transistor circuit, a mechanical relay, and the like.

In the embodiment shown in FIG. 3, a signal is sent from optical controller 42 to switch 34. Switch 34 controls the power supplied to the coil by power supply 30. Thus, this circuit works in substantially the same manner as the circuit of FIG. 1, with the exception that controller 32 of FIG. 1 is replaced by the combination of optical sensors 44, 46, and 48 and the corresponding optical controllers 42 associated therewith. It will be appreciated by those in the art that separate optical control circuits may be associated with each of optical sensors 46 and 48; they are not shown in FIG. 3 for the sake of simplicity.

In another embodiment illustrated in FIG. 3 by dashed lines, a signal is sent from optical controller 42 to microprocessor controller 50 which, in turn, provides on/off control commands to switch 34. This microprocessor 50 can be used with suitable software to vary the type and duration of the pulses supplied to the coils, and more than one circuit may be connected to it.

FIG. 4 illustrates a method for measuring the velocity which can be imparted to a magnetic body by applicants' apparatus. The structure illustrated in FIG. 4 is comprised of a brick support surface 52, a target 57, and means for measuring how far the magnetic body travels and how far it drops in its trajectory under the influence of gravity.

Referring to FIG. 4, a magetic body 38 is acclerated by coil 24 in accordance with the procedure described in connection with FIGS. 1 and 3. One may use a chamber with more than one coil 24.

The accelerated projectile 38 travels through the interior of cylinder 62 and towards target 57. The length ("x"), 58, of travel once it exits the superconductive chamber 62 is measured. The distance from the center line of its trajectory (see dotted line) to the bottom of the test device, 60, also is measured. Thereafter, the difference between the distance 60 and the height of that portion of target 57 where the projectile hits (measured from the bottom of the device to the point of impact) is calculated; this difference is "y".

The velocity of the projectile 38, as it leaves the cylinder 40, is epxressed by the following equation:

$$V = (g\, x^2/2y)^{\frac{1}{2}},$$

wherein V is the velocity (in meters per second), g is the gravitational constant, and x and y are as defined above. See, for example, the discussion of this equation in Sears et al.'s "University Physics," Sixth Edition (Addison-Wesley Publishing Company, Reading, Mass., 1983), the disclosure of which is hereby incorporated by reference into this specification.

The test procedure shown in this FIG. 4 was used in the experiment described in the examples.

FIG. 5 illustrates one preferred embodiment of a cylindrical superconductive chamber of this invention. In this embodiment, the internal diameter 63 of the chamber is 1.20 centimters, and the external diameter 67 is 2.54 centimeters. It will be appreciated that other chambers whose internal and external diameters are in the same ratio also may be used. Thus, e.g., if the internal and external diameters are 1.20 and 2.54 feet, respectively, the device may still be used.

FIG. 5A is a front view of the apparatus of FIG. 5, partially broken away to show the interior of the device. The length 65 of cylinder 40 may be from about 1 to about 10 centimeters and, in one embodiment, is 3.5 centimeteters.

Figure 7:
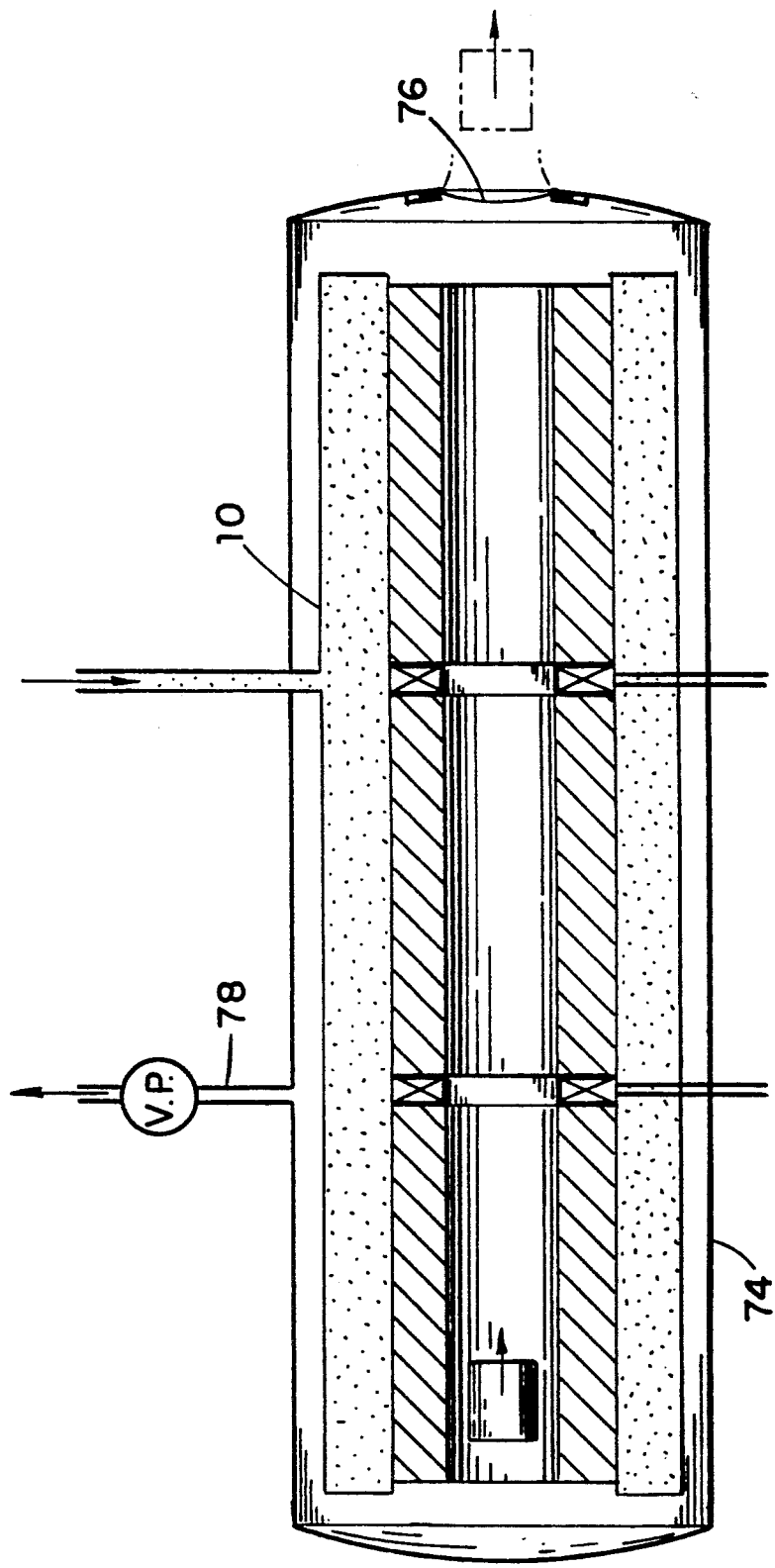
FIG. 7 illustrates an embodiment of the invention in which the contactless mass transfer device is maintained under vacuum.

FIG. 6 illustrates one square, superconductive plate 64 which may be used to prepare a square chamber 72 shown in FIG. 7. Additionally, or alternatively, the plate 64 may be used to construct the apparatus of FIG. 8.

Referring to FIG. 6, one preferred embodiment of plate 64 is shown. This preferred embodiment has a length 66 of 2.54 centimeters, a length 68 of 2.54 centimeters, and a width 70 of 1.34 centimeters. It may be connected with three other plates 64 to prepare square chamber 72.

Conventional means may be used to connect plates 64 to each other. Thus, by way of illustration, one may use an epoxy resin adhesive. As is known to those skilled in the art, epoxy resins have in their molecules a highly reactive oxirane ring. See, e.g., pages 287-289 of said "Materials Handbook," Twelfth Edition, supra. One preferred epoxy resin adhesive useful for joining plates 64 together is "1266 Epoxy A and B" which is manufactured by the Emerson and Cuming Company of Massachusetts and is sold by Dean Co. of Ithaca, New York.

FIG. 7 illustrates a preferred embodiment of the invention in which moisturized air resistance to the magnetized object's movement is minimized by means of a vacuum system. The apparatus is especially useful for imparting high velocity to magnetized projectiles.

As is known to those in the art, the drag upon an object may be estimated by the following equation:

$$\text{air drag} = 0.5 s V^2 A C_D.$$

wherein s is the density of air (in grams/cubic meter), V is the relative velocity between the magnetized object and air (in meters/second), A is the frontal area of the projectile (in square meters), and $C_D$ is the a dimensionless factor calculated from the ratio of the width and the height of the front of the projectile. This equation is discussed in F. M. White's "Fluid Mechanics".

The apparatus of FIG. 7 is designed to minimize the drag upon the projectile accelerated in the apparatus. It is comprised of an inlet line for liquid nitrogen (as is illustrated by the inlet arrow), means for imposing a vacuum (see the vacuum pump), by vaccum outlet pump line 78, and by vacuum enclosure 74. Once a vacuum is imposed upon the system via line 78, the system is substantially air tight; and a projectile travelling down the superconductive chamber of the device encounters virtually no resistance due to air.

In the embodiment illustrated in FIG. 7, the apparatus contains a diaphragm 76 which, as the projectile approaches it, opens up to allow its passage. Means (not shown) are provided to automatically open said diaphragm when the projectile approaches and/or close it after it departs. These means may comprise a magnetic and/or optical sensor system such as, e.g., the one described in connection with FIG. 3.

In another embodiment, not shown, the diaphragm does not open as the projectile approaches but is pierced by the projectile.

In yet another embodiment, the apparatus does not contain a diaphragm. In this embodiment, the magnetized object is moved within the vaccum chamber and never leaves it.

It is to be appreciated that, although most of the discussion herein has related to linear motion of magnetized bodies, applicants' apparatus is equally applicable to moving magnetized objects in a two-dimensional trajectory. Thus, by way of illustration, the principles of the invention may be used for a circular trajectory, an elliptical trajectory, a linear trajectory in which an object is moved along a straight line. Furthermore, systems can be constructed in which three-dimensional trajectories are provided; thus, for example, the magnetized object may be moved up and down a ladder trajectory. In each of these embodiments, a combination of superconductive tracks, coils, and means for providing asynchronous direct current to said coils is involved.

The velocity imparted to the magnetized object by the apparatus of FIG. 7 or FIGS. 1 and 3 is expressed by the equation:

$$V_f = V_i + at,$$

wherein $V_f$ is the final velocity of the magnetized object for each stage of an acceleration coil (in meters per second), $V_i$ is the initial velocity of the object, a is the acceleration imparted by electromagentic force (in meters/second squared), and t is the time (in seconds). Thus, as can be determined from this equation, linear motion occurs between two coils in the apparatus of the invention.

The preferred apparatus of the invention is comprised of at least two separate sections, each of which contains a portion comprised of superconductive material and a coil. It will be apparent that, depending upon the intensity and the direction of the electomagentic fields imparted to the two adjacent sections, the magnetized object will either increase or decrease its velocity between the sections. Thus, in one embodiment, the electromagnetic fields imparted to the coils both tend to increase the velocity of the projectile, thus accelerating it down the chamber. Alternatively, one may have one of the electromagentic fields around one of the coils opposing the motion of the magnetized object, thereby tending to slow it down or stop it as it approaches such coil; in such an embodiment, an object can be moved to one station, stopped by the field of the coil at or near this station, reaccelerated when the polarity of the field at or near such station is changed (by changing the polarity of the current to the coil), and the like. It is apparent that this process may be adapted to many industrial material handling processes in which an object may be moved to a station, worked upon, moved to another station, etc.

Figure 8:
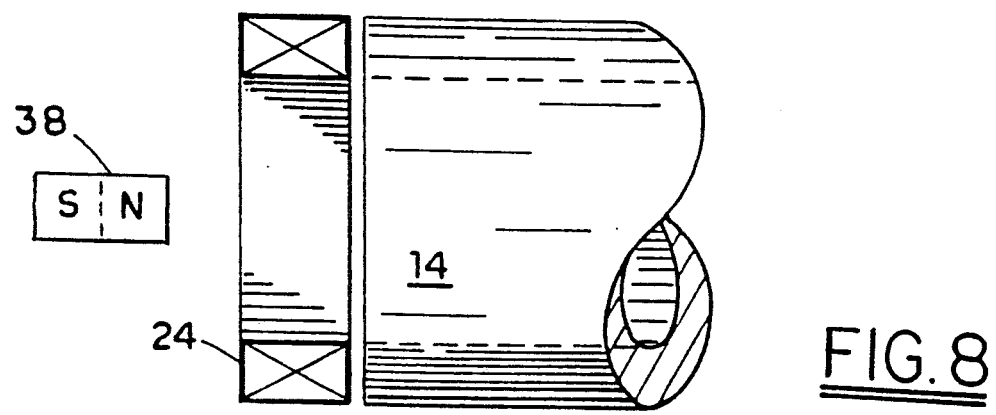
FIG. 8 illustrates a preferred arrangement of a magnetic projectile, a coil, and a superconductive chamber.

Referring to FIG. 8, the forces between a magnetized object and a coil are shown. As shown in this Figure, if the field of the coil closest to the north pole of the magnetized object is a south pole, it will attract object 38; and it will repel it if it is a south pole. As is known to those skilled in the art, the field of the coil will vary with the direction of the current flow in accordance with the right hand rule.

The coil in FIG. 8 is in the shape of a cylinder and has substantially the same shape as that of superconducting chamber material 14. As will be apparent to those skilled in the art, the shape of chamber 14 may be other than cylindrical. Thus, if the shape is chamber 14 is of such other shape, like a square shape (see, e.g., FIG. 6A), one or more coils which have a substantially square shaped should be used with this chamber. It is preferred that the interior shape of the coil substantially match the interior shape of the chamber.

It should be noted that, in the preferred embodiment illustrated in the Figures, the magnetized object is disposed within the chamber so that either its north pole or its south pole approaches the center of the coil. If, by way of illustration, the magnetized object were rotated 90 degrees, the field from the coil would tend to twist it.

A PROCESS FOR MAKING A CHAMBER COATED WITH SUPERCONDUCTOR

The superconductive chamber 14 (see FIG. 1) may be made by conventional means. All of it, or part of it, is comprised of the aforementioned superconductive material.

In one preferred embodiment, the superconductive chamber 14 is comprised of high Tc ceramic superconductors described in the Sleight article mentioned above. In another embodiment, the superconductive chamber 14 is comprised of Type II metallic superconductive material whose transition temperatures are lower than about 23 degrees Kelvin.

The Type II metallic superconductors are well known to those skilled in the art and are described, e.g., in T. Van Duzer et al.'s "Principles of Superconductive Devices and Circuits, " (Elsevier North Holland, Inc., New York, 1981); M. Tinkham's "Introduction to Superconductivity," (Robert E. Krieger Publishing Company, Malabar, Fla. 1980); and the "CRC Handbook of Chemistry and Physics," 65th Edition (CRC Press, Inc., Boca Raton, Fla., 1984), pages E-78 to E-88. The disclosure of each of these publications is hereby incorporated by reference into this specification.

Some of the preferred Type II metallic superconductors are $Nb_3Ge$, $Nb_3(Al_{75}Ge_{25})$, $Nb_3Sn$, $V_3Ga$, Nb—Ti, and the like, with $H_{c2}$ values higher than 10 Tesla.

As will be apparent to those skilled in the art, when a Type II metallic superconductor is used, the cooling means must be adequate to cool the chamber to below the critical temperature of the superconductor used. Thus, e.g., one may use the low-temperature liquids described on pages 626–629 of Volume 3 of the "McGraw-Hill Encyclopedia of Science & Technology" (McGraw-Hill Book Company, New York, 1977), the disclosure of which is hereby incorporated by reference into this specification. Thus, for example, liquid helium (4.2 degrees Kelvin) or liquid hydrogen (14 degrees Kelvin) may be used to cool some of these superconductors.

Conventional low temperature refrigeration devices may be used in conjunction with the low-temperature liquid(s). Thus, one may use the ultra-low temperature or low temperature refrigerators obtainable from Cryogenic Consultants, Ltd of 231 The Vale, London, England. Thus, one may purchase such a refrigerator from Janis Research Company, Inc. of 2 Jewel Drive, Wilmington, Mass. Thus, one may purchase such a refrigeration unit from Oxford Instruments of North America, 3A Alfred Circle, Bedford, Mass.

In one preferred embodiment, a substrate in the desired shape of a chamber is coated with superconductive material. It is preferred that a relatively thick film of superconductive material greater than 0.1 micron and, preferably, on the order of from about 1 to about 100 microns, be coated onto the substrate.

The chamber substrate may be coated with superconductive films prepared by a plasma evaporation technique. See, for example, the article by M. Sayer et al. entitled "Ceramic Thin Films: Fabrication and Applications," Science, Volume 247, Mar. 2, 1990, pages 1056 to 1060. Reference also may be had to an article by X. W. Wang et al. entitled "Superconducting $Y_1Ba_2Cu_3O_{7-x}$ Films by RF Plasma Aerosol Evaporation at Atmospheric Pressure," published in the Proceedings of the Conference on the Science and Technology of Thin-Film Superconductors," held Apr. 30–May 4, 1990 at Denver, Colo.

Thus, e.g., the superconductive film may be prepared by MOCVD techniques. See, for example, an article by Peter E. Norris et al. entitled "In-situ thin films by MOCVD," Superconducting Industry, Vol. 3, No. 1, Spring, 1990.

The high Tc superconductors currently available are ceramic materials. It is known that ceramic materials may be fabricated into film by evaporation or by sputtering methods; however, both of these methods are usually conducted under vacuum. See, e.g., B. Oh et al., "Critical current densities and transport in superconducting YBaCuO films made by electron beam co-evaporation," Applied Physics Letters 51, 852 (1987); M. Hong et al., "Superconducting Y-Ba-Cu-O oxide films by sputtering," Applied Physics Letters 51, 694 (1987); D. Dijkkamp et al., "Preparation of Y-Ba-Cu oxide superconductor thin films using pulsed laser evaporation from high Tc bulk material," Applied Physics Letters 51, 619 (1987); and S. Witanachchi et al., "Deposition of superconducting Y-Ba-Cu-O films at 400 degrees centigrade without postannealing," Applied Physics Letters 53, 234 (1988).

It is known that superconductive films with thicknesses in excess of 100 microns may be prepared by a tape-casting process. See, e.g., M. Ishii et al., "Fabrication of superconducting YBaCuO films by a tape casting method," Japanese Applied Physics 26, L1959 (1987).

A thick film printing technique can be utilized to prepare a film. See, e.g. P. Moran's "Hybrid Microelectronic Technology," Electrocomponent science monograms, volume 4 (Gordon and Breach Science Publishers, New York, 1984).

Many other references disclose the preparation of films of superconductive material. See, e.g., (1)H.S. Kwok et al., "Laser evaporation deposition of superconducting and dielectric thin films," Applied Physics Letters, Volume 52 (21), May 23, 1988; (2)S. Witanachchi et al., "Laser Deposition of Superconducting and Semiconducting Thin Films," in "Superconductivity and its Applications," edited by H. S. Kwok et al. (Elsevier Company, New York, 1988), at pages 194 et seq. The disclosure of each of these publications is hereby incorporated by reference into this specification.

The substrate onto which the superconductor is to be coated may be any substrate which are commonly used with supercoductive films. Thus, the substrate may comprise nickel, sapphire, copper, and the like. In one embodiment, a buffer layer magnesia is interposed between the substrate and the superconductive coating. In another embodiment, the buffer layer is cubic zirconia.

By way of illustration, one may use any of the substrates mentioned in M. Sayer's "Ceramic Thin Films . . ." article, supra. Alternatively, one may use one or more of the substrates described on page 286 of "Superconducting Devices," edited by S. T. Ruggiero et al. (Academic Press, Inc., Boston, 1990). The disclosure of these publications is hereby incorporated by reference into this specification.

In one embodiment, the substrate has a thermal conductivity of greater than 4 Watts-cm$^{-1}$-Kelvin$^{-1}$.

A PROCESS FOR PREPARING A MAGNETIZED FUEL PELLET

When the chamber 14 (see FIGS. 1 and 3) is comprised of or consists of superconductive material, the object 38 (see FIGS. 2 and 4) preferably is magnetized; the Meissner effect which occurs between the chamber 14 and magnetized object 38 causes such object to levitate. Alternatively, the chamber 14 can be magnetized, and the object 38 can be comprised of superconductive material. When the chamber 14 is superconductive, magnetized object 38 may be attracted and/or repelled by the electromagnetic fields created by coils 16. When the chamber 14 is magnetized, however, superconductive object 38 may only be repelled by the fields created by coils 16.

It is preferred that chamber 14 comprise superconductive material and that object 38 be magnetized. In one especially preferred embodiment, object 38 is a frozen pellet composed of one or more of the isotopes of hydrogen.

As is known to those skilled in the art, the isotopes of hydrogen are hydrogen, deuterium, and tritium. Molecular hydrogen exists in two varieties, ortho- and para-, named according to their nuclear spin types. Ortho-hydrogen molecules having a parallel spin; and para-hydrogen molecules have an antiparallel spin.

In one embodiment, the frozen fuel pellet is comprised of at least about 90 weight of hydrogen. In another embodiment, the frozen fuel pellet is comprised of at least about 90 weight percent of deuterium. In another embodiment, the frozen fuel pellet is comprised of at least 90 weight percent of tritium. In yet another embodiment, the frozen fuel pellet is comprised of at least 90 weight percent of a mixture of at least two isotopes selected from the group consisting of hydrogen, deuterium, and tritium.

The frozen fuel pellets, and their preparation, are described in the S. L. Milora papers and the M. J. Gouge paper described elsewhere in this specification. The disclosure of each of these publications is hereby incorporated by reference into this specification.

The magnetic moments of hydrogen and its isotopes are described on page E-65 of said CRC Handbook of Chemistry and Physics, supra.

The frozen fuel pellet preferably weighs at least 1 gram and, preferably, weighs more than about 10 grams. In one preferred embodiment, the frozen fuel pellet weighs from about 10 to about 15 grams.

The fuel pellet used in the process must be frozen. As is known to those skilled in the art, as long as the temperature of the pellet is below about 20 degrees Kelvin, the pellet remains in the ice phase. The isotopes of hydrogen freeze in the range of from about 14 to about 20 degrees Kelvin; see, e.g., P. C. Sours, "Hydrogen Properties for Fusion Energy," (University of California, Berkeley, 1986).

In one embodiment, the maximum dimension of the frozen fuel pellet does not exceed about 10 millimeters.

The frozen fuel pellet may be magnetized by a process in which it is subjected to a magnetic field with a field strength greater than about 10 Tesla while being maintained at a temperature of less than 0.01 degrees Kelvin until the pellet has a well-aligned magnetic moment. It is preferred to magnetize the pellet by subjecting it to a magnetic field with a field strength of greater than about 13 Tesla.

In this embodiment, the frozen fuel pellet is subjected to the aforementioned magnetic field until it has a field strength of at least about 1 Gauss. The field strength of the pellet may be measured by a Hall probe (obtainable from Bell Communications Company of Florida) which is placed 1 centimeter away from the front face of the pellet. The Hall probe is then electrically connected to a Gauss meter, also obtainable from the Bell Communications Company of Florida.

In another embodiment, the frozen pellet is magnetized by being coated with a magnetic material sufficient to impart to it the field strength of at least about 1 Gauss.

In one embodiment, the magnetic material coated onto the frozen pellet is ferromagnetic. As is known to those skilled in the art, a ferromagnetic material is a material that exhibits the phenomena of hysteresis and saturation and whose permeability is dependent upon the magnetizing force; see, e.g., A.S.T.M. Standard Test A340, "Magnetic Testing, Symbols, and Conversion Factors," the disclosure of which is hereby incorporated by reference into this specification.

In another embodiment, the magnetic material coated onto the frozen pellet is ferrimagnetic. As is known to those skilled in the art, a ferrimagnetic material is one in which unequal magnetic moments are lined up anti-parallel to each other. See said A.S.T.M. Standard Test A340.

Some of the ferromagnetic and/or ferrimagnetic materials which may be used in this embodiment are listed on pages E-101 to E-111 of the "CRC Handbook of Chemistry and Physics," supra. These materials may be coated onto the frozen fuel pellet by conventional means well known to those skilled in the art.

In general, one should coat a magnetic film with a thickness of from about 0.1 to about 100 microns onto the surface of the frozen fuel pellet.

In one embodiment, the magnetic film is coated onto the pellet by simultaneous metal sputtering and plasma polymerization. See, e.g., C. Laurent et al., "Magnetic properties of granular co-polymer thin films," Journal of Applied Physics, Volume 65, Mar. 1, 1989, pages 2017–2020;

In another embodiment, the magnetic film is coated onto the pellet by melt spinning; see, e.g., R. Coehoorn et al., "Permanent magnetic materials based on $Nd_2Fe_{14}C$ prepared by melt spinning," Journal of Applied Physics, Volume 65, Jan. 15, 1989, pages 704–709.

Other techniques for preparing magnetic films are disclosed in Z. G. Li et al., "Observations of nanocrystals in thin TbFeCo films," Applied Physics Letters 55, Aug. 28, 1989, pages 919 to 921 (sputtering) and in K. Nakajima et al., "Formation of ferromagnetic iron nitrides in thin films by high-dose nitrogen ion implantation," Journal of Applied Physics, Volume 65, Jun. 1, 1989, pages 4357 to 4361(reactive sputtering).

These techniques are but some of many known to those skilled in the art. Thus, all of the processes for preparing thin films of superconductive material, described in another portion of this specification, also may be used.

A PROCESS FOR PREPARING A MAGNETIZED CHAMBER

In one embodiment, chamber 14 (see FIG. 1) is magnetized, and projectile 38 (see FIGS. 2 and 4) is comprised of superconductive material.

In this embodiment, the chamber 14 has a magnetic moment, as measured 1 centimeter away from its interior surface, of at least about 1 Gauss. It is preferred that the magnetic moment of the chamber 14 be at least 10 Gauss. It is even more preferred that the magnetic moment of the chamber 14 be at least 100 Gauss. As is the case with the magnetized projectile 38, the magnetic moment of the chamber 14 may be measured with said Hall probe and Gauss meter.

In one embodiment, chamber 14 consists of or is comprised of one or more of the aforementioned ferromagnetic or ferrimagnetic materials. In another embodiment, a ferromagnetic and/or ferrimagnetic material is coated onto at least the interior surface of chamber 14.

In the embodiment where a magnetic material is coated onto at least the interior surface of the chamber 14, it is preferred that the coating be from about 1 to about 100 microns thick. In general, a sufficient amount of material will be coated onto the chamber until it possesses the desired magnetic moment.

The substrate used in chamber 14 onto which the magnetic material may be coated may be any of the substrates mentioned before with regard to the coating of superconductive materials onto chamber 14. In general, the thermal conductivity of such substrate should be at least about 4 Watts—$cm^{-1}$—$K^{-1}$.

The magnetic material may be deposited as a film onto the substrate for chamber 14 by one or more of the methods described above for the coating of magnetic material onto the nuclear fuel pellet and/or for the coating of superconductive material onto the chamber 13.

A PROCESS FOR PREPARING A SUPERCONDUCTIVE FUEL PELLET

A frozen fuel pellet which is comprised of a coating of superconductive material may be manufactured in accordance with the procedure described above for coating the chamber 14 with superconductive material, subject to the limitation that the coating process should be conducted at a temperature less than about 20 degrees Kelvin. In general, a coating of from about 1 to about 100 microns thickness should be applied to the fuel pellet.

ENCLOSING THE PELLET IN A MOVABLE CONTAINER

In one embodiment, the frozen fuel pellet is neither magnetized nor coated with superconductive material. In this embodiment, the pellet is placed into a container which is either magnetized (when chamber 14 is superconductive) or is comprised of superconductive material (when chamber 14 is magnetized). This container, often referred to as a "tote box," may be magnetized or rendered superconductive by any of the techniques described above. One advantage of this process is that deposition of a magnetic or superconductive film onto the tote box may occur at a temperature higher than about 20 degrees Kelvin.

PREPARATION OF SUPERCONDUCTIVE ELECTROMAGNETIC COILS

In one embodiment illustrated in FIG. 1, electromagnetic coils 16 consist of the conventional copper material. In another preferred embodiment, these coils consist of superconductive material.

In this embodiment, the superconductive material may be either ceramic or metallic. When the superconductive material comprising the coils is ceramic, the ceramic material may first be extruded into the shape of the coil and then fired. The fired coil thus produced can be used to furnish both electromagnetic force and Meissner force. Furthermore, unlike the conventional metallic normal conductor coils, these ceramic coils need not separate the sections of superconductor chamber 14 by an air gaps which are less than 50 percent of the levitation height of the system.

When the coil is comprised of metallic superconductor material, such material may be formulated into the coil by conventional coil winding techniques.

As is known to those in the art, one may calculate the velocity obtainable with applicant's system by the well known laws of physics described in Harnwell's "Principles of Electricity and Electromagnetism," supra (see equation 11.5 at page 385) and in Robert L. Weber et al.'s "College Physics" McGraw-Hill Book Company, New York, 1959 (see equation 3.0 at page 75). It will be readily apparent from these equations that a velocity in excess of 10 kilometers per second is readily obtainable with applicant's system and will vary with the number of coils, the number of turns per coil, the current passing through each coil, the shapes of the coils, etc.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the claims.

I claim:

1. A process for moving an article at a velocity in excess of 10 Kilometers per second, comprising the steps of:
    (a) providing a contactless, mass transfer system comprised of a chamber formed by alternating sections of superconductive material and electromagnetic coils, and means for cooling said chamber, wherein said chamber is comprised of interior surfaces, and wherein:
        1. said interior surfaces of said chamber define a symmetrical shape;
        2. said chamber is comprised of at least two sections, each of which consists essentially of superconductive material which has a first critical field value greater than about 10 Gauss and a second critical field value greater than about 10 Tesla wherein said sections which consist essentially of superconductive material are separated from each other by an air gap;
        3. an electromagnetic coil is disposed within each air gap, wherein:
            (a) the length of each of said sections of superconductive material is at least four times as great as the width of each of said electromagnetic coils, and
            (b) said chamber is comprised of at least two of said electromagnetic coils;
    (b) providing a magnetized object which has a weight of at least about 1 gram and a magnetic field strength of at least about 1 Gauss;
    (c) disposing said magnetized object within said chamber;
    (d) delivering asynchronous direct current pulses to said chamber while said magnetized object is disposed within said chamber, wherein said direct current pulses are delivered to at least two of said electromagnetic coils while said magnetized object is disposed within said chamber, wherein said direct current pulses are delivered to at least two of said electromagnetic coils in said chamber at different points in time,
    whereby said magnetized object is caused to move within said chamber.

2. The process as recited in claim 1, wherein said magnetized object is comprised of a frozen fuel pellet, wherein said frozen fuel pellet is comprised of at least about 90 weight percent of an isotope of hydrogen selected from the group consisting of hydrogen, deuterium, tritium, and mixtures thereof.

3. The process as recited in claim 2, wherein said superconductive material has a critical temperature greater than about 85 degrees Kelvin.

4. The process as recited in claim 2, wherein said superconductive material is a Type II superconductor.

5. The process as recited in claim 4, wherein the first critical field of said superconductive material is from about 10 to about 100 Gauss.

6. The process as recited in claim 5, wherein the second critical field of said superconductive material is from about 30 to about 100 Tesla.

7. The process as recited in claim 6, wherein the interior surfaces of said chamber define a circular cross-section.

8. The process as recited in claim 7, wherein said chamber has a circular cross-section.

9. The process as recited in claim 6, wherein said chamber has a square cross-section.

10. The process as recited in claim 8, wherein said coils are comprised of a metal selected from the group consisting of copper, silver.

11. The process as recited in claim 10, wherein said metal is copper.

12. The process as recited in claim 10, wherein said metal is silver.

13. The process as recited in claim 8, wherein said coils consist essentially of superconductive material.

14. The process as recited in claim 13, wherein said superconductive material is a ceramic material.

15. The process as recited in claim 8, wherein said coils are comprised of magnet wire.

16. The process as recited in claim 15, wherein said magnet wire has an AWG gauge of from about 20 to about 30.

17. The process as recited in claim 16, wherein at least one of said electromagnetic coils is contiguous with at least two of said sections of superconductive material.

18. The process as recited in claim 17, wherein a power supply is used to deliver said asynchronous direct current pulses to said chamber.

19. The process as recited in claim 18, wherein said superconductive material is comprised of at least one inorganic oxide.

20. The process as recited in claim 19, wherein said superconductive material is comprised of at least two inorganic oxides.

* * * * *